United States Patent Office 3,726,850
Patented Apr. 10, 1973

3,726,850
LIGNIN DISPERSING AGENT
William John Detroit, Schofield, Wis., assignor to
American Can Company, Greenwich, Conn.
No Drawing. Filed July 29, 1971, Ser. No. 167,501
Int. Cl. C07g 1/00
U.S. Cl. 260—124 A                                6 Claims

ABSTRACT OF THE DISCLOSURE

A water-, alkali- and acid-soluble, oxidized lignin dispersing agent, substantially free of organically bound sulfur, formed by the reaction of ozone on lignin obtained from the spent liquors of the alkaline pulping of wood.

BACKGROUND OF THE INVENTION

Field of the invention

This invention relates to water-soluble, oxidized, substantially sulfur-free lignin derivatives formed by the reaction of ozone on lignin from alkaline pulping liquors, the ozone-oxidized lignin material being of particular utility as a dispersant in a wide variety of applications, including the dispersion of clays, dyestuffs, insecticides and the like.

Description of the prior art

Lignin suitable for use in this invention is obtained as a by-product of the pulping of wood by alkaline pulping processes and is recovered from the spent pulping liquor separated from the cellulose pulp fibers which are the primary product of the pulping process. The lignin-containing liquor obtained from alkaline pulping processes is acidified and the lignin, being insoluble in an acidic medium, is precipitated and separated by filtration from the water-soluble salts which remain in the filtrate. The precipitated lignin is soluble in an alkaline aqueous medium and was, in the past, employed to some limited extent as a dispersing agent. Its general utility was, however, severely limited due to its insolubility at a pH lower than about 10 and its use in applications dependent upon its surface active properties has been substantially, if not completely, supplanted by surface active agents of greater effectiveness and versatility. Lignin from alkaline pulping processes has been treated in a variety of ways in order to increase its effectiveness and versatility as a dispersant or surface active agent. For example, sulfonic acid derivatives of lignin may be prepared in which the —SO$_3$H groups enter the lignin molecule to produce water- and acid-soluble material suitable for use as an emulsifying and dispersing agent as disclosed in U.S. Pat. 2,680,113. Similar lignosulfonic acid derivatives are obtained from the spent liquors resulting from the pulping of wood chips by the sulfite pulping process. Lignin may also be converted to a water-soluble material by reaction with chlorosulfonates to form lignin sulfates having improved solubility and surface active properties in water and acidic solutions, as disclosed in U.S. Pat. 2,688,611. Other means for improving the solubility of lignin in water include the preparation of lignin aliphatic acids by condensation of lignin in water include the preparation of lignin aliphatic acids by condensation of liquor lignin with alpha halogen acids such as chloroacetic acid as disclosed in U.S. Pat. 2,503,297.

Although lignin derivatives of improved properties have been prepared by the above and other treatments of the alkali-soluble lignin from spent pulping liquor, none of the derivatives has proven to have as great versatility in dispersant applications as is desirable. It has now been found that a highly effective surface active material may be prepared from lignin by controlled treatment with ozone which yields a product having excellent solubility in both alkaline and acidic aqueous solutions and which is extremely effective as a dispersant in a wide variety of applications, including dispersion of pesticides, dyestuffs, carbon black and inorganic compounds such as clays, titanium dioxide, calcium carbonate and the like, and is effective in ore flotation and drilling mud dispersion applications as well. The ozone treated lignin, which is essentially free of organically bound sulfur, is also unique in its high temperature stability, retaining its surface active properties at elevated temperatures which cause breakdown of sulfonated lignins and other sulfur-containing lignin-derived dispersants.

BRIEF SUMMARY OF THE INVENTION

The process of this invention, in the preferred embodiment thereof, involves, as a first step, the isolation of alkali soluble lignin from spent liquor obtained from the pulping of wood chips by any of the common soluble base alkaline cooking processes, including the kraft or sulfate process, the soda process, the alkaline vapor phase cooking process and the like. The lignin isolation is commonly carried out in conventional manner by acidifying the spent alkaline cooking liquor from the pulping process by addition of mineral acid or with flue gas to a pH of about 5. The lignin, being insoluble in acidic solution, precipitates and is isolated by conventional filtering and washing procedures. The resulting precipitated lignin serves as the starting material for the process of this invention.

To carry out the reaction with ozone, the washed lignin is redissolved in an alkaline aqueous medium and ozone-enriched oxygen is passed through the solution until an ozone absorption approximating 10–20% based on the weight of lignin is achieved. The properties of the product obtained are dependent on the temperature maintained on the system during the reaction period, the concentration of the lignin, the pH of the solution, the amount of ozone absorbed, and on the particular source (i.e., the type of wood utilized in the pulping process) of the lignin employed, as will be discussed in detail hereinafter. When the desired amount of ozone has been absorbed and the oxidation reaction brought to completion, the reaction mixture is spray dried to yield a product which is soluble in both alkaline and acidic aqueous media and which is an unusually versatile dispersing agent in a variety of applications.

It is an object of this invention to provide a method for treating lignin from soluble base alkaline pulping processes to obtain a dispersing agent which has utility in both alkaline and acidic aqueous media.

It is a further object of this invention to provide a method for producing an oxidized lignin product which has high dispersing properties in a wide variety of applications and which has a high degree of thermal stability.

An additional object is to provide an acid and alkali soluble lignin-based dispersing agent which contains essentially no structurally bound sulfur-containing solubilizing groups and which displays great versatility as a surface active compound for dispersion of clays, dyestuffs, pesticides, carbon black and other materials.

These and other objects and advantages of the invention will become apparent from the discussion which follows.

DISCUSSION OF PROCESS VARIABLES

Raw material: As previously stated, the raw material for carrying out the present invention is lignin obtained from spent alkaline pulping liquor which results from the pulping of wood or similar fibrous vegetable matter by any of the common soluble base alkaline pulping processes. Although lignin from the pulping of any of the common pulp producing sources has been found generally satisfactory for the purpose of this invention, lignin from the pulping of wood chips is preferred, the highest quality products being prepared by the process of this invention from lignin resulting from the alkaline pulping of softwood wood chips.

It has been hereinbefore indicated that the lignin is preferably separated from the remaining alkaline pulping liquor constituents prior to carrying out the process of this invention. The process may alternatively be carried out on the whole spent liquor, however, with results which are only slightly less satisfactory than when separated lignin is used, if allowance is made, in the evaluation of the effectiveness of the resulting dispersant material, for the substantial amount of non-contributory material present in the product.

Ozone generation: Ozone is, of course, an unstable material and must be generated substantially at the point of use to prevent its degeneration before its unique oxidative properties can be utilized in the desired manner. Ozone is commonly generated by passing an oxygen-containing gas such as air, or preferably pure oxygen, through a region of high voltage discharge, which converts a small but significant amount of the oxygen into ozone. The percentage conversion may be varied by control of the temperature of the system, the speed of passage of the gas, the potential at the dielectric and the power input to the ozonator. In the examples reported herein, a Welsbach water-cooled azonator utilizing 200 watts of power and generating a potential of about 30,000 volts at the dielectric was utilized. This unit economically converts about 3% of a pure oxygen stream to ozone at a flow rate convenient for laboratory scale oxidations of 100–500 grams of lignin and was used in the accumulation of all data presented herein.

Alkalinity of the reaction mixture: The oxidation of lignin by ozone is carried out in an aqueous medium made strongly alkaline by the addition of a hydroxide of an alkali metal or ammonia. In order to achieve and maintain effective absorption and reaction of the ozone passed into the reaction mixture, the lignin solution must be maintained at a pH of at least 8 throughout the reaction period. The oxidation of the lignin molecule which results from the absorption of ozone in the system produces carboxyl groupings on the lignin which react with alkali present in the solution, thus lowering the overall alkalinity of the system as the reaction proceeds. In order to maintain the system at a pH above the required minimum, an excess of alkali may be added in the original reaction mixture, or caustic alkali may be periodically or continuously added as the reaction proceeds. It has been found that free alkalinity is removed from the reaction mixture both by the formation of carboxyl groups by oxidation of (1) the carbonyl groupings in the lignin molecule and (2) at least a portion of the terminal —$CH_3$ groupings on alkyl side chains, and also by a demethylation of at least a portion of the methoxyl groupings which appear as a portion of the ring structure. Such demethylation results in the formation of phenolic groupings which would react with free alkali to form alkali metal phenolate salts in known manner.

It should be noted that treatment of lignin by oxygen, alone, will not produce the oxidative effects which are achieved by ozone, which has a substantially higher oxidation potential than oxygen. Oxygen is not a sufficiently active oxidizing agent to oxidize methyl groups or carbonyl groups on the lignin molecule to carboxy groups under the conditions described hereinafter, nor will oxygen alone result in demethylation of the methoxyl groups present in the lignin molecule. These facts have been clearly established in control tests wherein pure oxygen was passed through the reaction vessel containing lignin under conditions comparable to those used in carrying out the ozone oxidations of this invention. These tests clearly established that the passage of pure oxygen did not result in any appreciable decrease in the methoxy content of the lignin, nor was the carboxy value of the lignin appreciably increased. The results of these tests are confirmed by the fact that the water and acid-solubility of the oxygen-treated lignin was not substantially altered, whereas the ozone-treated lignin acquired a high degree of solubility under like conditions.

Temperature: The oxidation of alkaline spent liquor lignin may be carried out at any convenient temperature between about 0° C. and 90° with substantially equivalent results in terms of product quality. For reasons of efficiency and economy in terms of cooling requirements, it is preferred to carry out the reaction in the range of about 45° C. to about 55° C. Temperatures in excess of about 60° C. introduce further complexities in the reaction as the efficiency of ozone absorption is substantially reduced at these elevated temperatures and some free ozone is lost from the system. Furthermore, at elevated temperatures in an alkaline system, ozone exhibits a tendency to become hydrolyzed to form free oxygen, which is ineffective in bringing about the desired type of oxidation effect on the lignin molecule. Thus, a further loss of efficiency results if the temperature is not suitably maintained below the upper limit stated above.

Concentration of reactants: The concentration of lignin in the reaction mixture has a substantial effect on the amount of ozone which will be reactively absorbed by the system and upon the properties of the resulting product. In general, it is more desirable to utilize fairly concentrated solutions of lignin in the reaction for reasons of economy in drying the final product-containing solution. It has been found, however, that as the oxidation proceeds, the viscosity of the reaction mixture rises substantially and, as a consequence, the efficiency of absorption of ozone decreases to a point where continuance of the process to obtain a higher degree of oxidation becomes economically impractical. Starting, for example, with an aqueous solution containing 25% by weight of lignin and 5 to 7% caustic soda, absorption of ozone proceeds smoothly at between 0° C. and 55° C. until about 15% by weight of ozone based on the weight of lignin has been absorbed, after which the absorption rate becomes substantially retarded and soon becomes economically unattractive. On the other hand, starting with a dilute solution containing only 5% of lignin and about 1.25% of caustic soda, ozone absorption proceeds smoothly until as much as 30% by weight of ozone based on the weight of lignin has been absorbed. The product obtained in the latter case has a somewhat lower viscosity at a given concentration in water and is somewhat less versatile as a dispersant in a number of applications. Without wishing to be limited as to theory, it is believed that, in the very low concentrations of lignin in the reaction mixture, ozone absorption and reaction results in a cleavage of a portion of the unsaturated carbon to carbon bonds in the lignin molecule, yielding a product having somewhat lower average molecular weight and consequently lessened efficiency in dispersant activity.

In general, then, it is preferred that the lignin concentration in the reaction solution be in the range of 5% to 25% and most preferably about 20% in order to obtain a product having the optimum dispersant properties while operating the process for its preparation in an economically practical manner and without undue loss of unreacted ozone.

Ozone absorption: It has been hereinbefore mentioned that ozone is more readily absorbed and reacted at low temperature or low solids concentration and that a higher proportion of the ozone passed into the reactor is lost by hydrolysis or non-absorption when the reaction is carried out in a solution of high viscosity or at temperatures above about 60° C. It should also be noted that a product of this oxidation reaction having the most desirable combination of properties as a dispersant is obtained when the ozone absorption amounts to a total of about 11 to about 14% based on the weight of lignin in the reaction mixture. Products having satisfactory dispersant properties in a limited number of applications may be produced by an absorption and reaction of between about 5 and 30%. Some of the products within this range, however, may be found somewhat less versatile in their overall utility than those in which the ozone absorption was within the preferred range of 11 to 14% previously mentioned.

DESCRIPTION OF PREFERRED EMBODIMENTS OF THE INVENTION

The following specific examples of the process of this invention and of the properties of the products obtained thereby will serve to exemplify the advantages of the invention in providing a substantially sulfur-free oxidized lignin dispersant of unique versatility in a wide variety of applications requiring a surface active agent having high solubility in both acidic and alkaline solutions and superior temperature stability.

Example 1.—One hundred gm. of lignin obtained from spent softwood kraft pulping liquors was dissolved with 25 gm. of sodium hydroxide in 308 cc. of water. The lignin solution was maintained at 50–55° C. and oxygen containing 3% ozone was passed through the solution at a rate of between 1 and 2 liters of gas per minute until 12% of ozone based on the weight of lignin had been absorbed. The time required to reach this degree of ozone absorption was about two hours. The pH of the solution dropped from a value of above 11 to a value of about 8 during the course of the reaction. After absorption of the desired amount of ozone, the resulting solution of ozone-oxidized lignin was spray dried to yield a material which was soluble in water and in acids to a pH of 2.5.

The ozone-oxidized lignin obtained in accord with the procedure of Example 1 was tested as a dispersant for a variety of inorganic materials including Stellar clay, cement, calcium carbonate and titanium dioxide. In each case, an aqueous paste or slurry of the desired solids concentration of the specific inorganic material was prepared and separated into control and test portions. To the test portion was added a suitably effective concentration of the ozone-oxidized lignin product of Example 1, above, while the control portion was treated with an equivalent concentration of a commercial sulfonated lignin dispersant hitherto regarded as the accepted standard of excellence in dispersion of the inorganic pulverulent materials under test.

Dispersions of clay and cement exhibit a high degree of thixotropic behavior, whereas calcium carbonate and titanium dioxide dispersons are not thixotropic to any appreciable extent. Values for apparent viscosity, yield point, zero gel and Fann 600° and Fann 3° were determined on the thixotropic dispersions in accordance with the standard operating procedures furnished with the Fann Rotational Viscosimeter produced by the Fann Instrument Company, Houston, Texas. Viscosities of the non-thixotropic dispersions of calcium carbonate and titanium dioxide were determined by a Brookfield viscometer. Test results are recorded in the following Table I.

It is apparent from the data in Table II, that the ozone-oxidized lignin of the present invention is extremely effective as a dispersing agent for a variety of inorganic materials as evidenced by the dramatic reduction which it produces in viscosity, yield point and zero gel strength of aqueous dispersions in comparison with a standard sulfonated lignin commonly in commercial use for this purpose.

The ozone-oxidized lignin is also extremely effective in the dispersion of a variety of dyestuffs and is particularly valuable in those cases where high temperature stability of the dispersant is essential, as, for example, when in the dyeing of fabrics, the dyestuff dispersion must be subjected to temperatures at or above the boiling point of water. Data in the following Table II illustrate the dispersive power and temperature stability of the ozone-oxidized lignin of this invention in comparison to sulfonated lignin control dispersants commonly used in the commercial dispersion of dyestuffs. In conducting the tests, 33 gm. of a standard commercial blue dye, 25 gm. of the selected lignin dispersing agent and 90 gm. of water were ball milled for 24 hours at a pH of 6.5–7.5, at which time the milled dyestuff was sufficiently dispersed so that a diluted aliquot passed completely through a No. 230 Reeve-Angel filter paper on a Buchner funnel without leaving specks of dye on the paper. The dispersed dye paste was then dried at 55° C. and pulverized through a 0.027 screen on a Milcro-pulverizer. The dried, dyestuff-dispersant blend was then standardized by blending with anhydrous sodium sulfate in the proportion of 29% pulverized dyestuff-dispersant blend and 71% sodium sulfate. In performing a dispersion test on the dyestuff, a 3% dispersion of the standardized dry dyestuff in water was formed and maintained at 70° C. for 5 minutes and filtered through a No. 230 Reeve-Angel filter paper on a Buchner funnel. In order to pass this dispersion test, essentially no trace of the dye should remain on the filter paper. In order to conduct a test for heat stability, a 3% aqueous dispersion of the standardized dry dyestuff was prepared and steamed with live steam at a moderate boil for 5 minutes and filtered through a No. 230 Reeve-Angel filter paper. The test is passed if the filter paper retains substantially no trace of the dye.

TABLE II.—DISPERSION OF BLUE DYE

| Dispersant | Dispersion test (70° C.) | Heat stability test (live steam) |
|---|---|---|
| Ozone-oxidized lignin | Passed | Passed. |
| Sodium lignosulfonate from sulfite spent liquor | do | Failed. |
| Sodium salt of sulfonated kraft lignin | do | Do. |

The above data indicate that the ozone-oxidized lignin exhibits greater heat stability in dye dispersion than the commonly utilized sulfonated lignin dispersants. While not wishing to be limited in any way by theory, it is believed that the higher thermal stability of ozone-oxidized lignin is attributable to the fact that the molecule is essentially free of chemically bound sulfur-containing groups, in contrast to the sulfonated lignin dispersant

TABLE I.—VISCOSITY PROPERTIES OF INORGANIC MATERIAL DISPERSIONS

| Dispersed material | Solids concentration, wt. percent | Percent dispersant on solids | Apparent viscosity (cps.) | Yield point (lbs./100 sq. ft.) | Fann 600° | Fann 3° | O' Gel strength |
|---|---|---|---|---|---|---|---|
| Stellar clay with sulfonated lignin dispersant [1] | 41 | 0.126 | 97 | 158 | 194 | 75 | 65 |
| Stellar clay with ozone-oxidized lignin dispersant | 41 | 0.126 | 22 | 32 | 44 | 26 | 28 |
| Cement (Ideal Type 3) with sulfonated lignin dispersant [1] | [2] 68.5 | 1.0 | 300+ | 300+ | 300+ | 10 | 8 |
| Cement (Ideal Type 3) with ozone-oxidized lignin dispersant | [2] 68.5 | 1.0 | 42 | 11 | 85 | 11 | 15 |
| Calcium carbonate with sulfonated lignin dispersant [1] | 50 | 0.25 | [3] 130 | 3 | | | |
| Calcium carbonate with ozone-oxidized lignin dispersant | 50 | 0.25 | [3] 12 | 1 | | | |
| Titanium dioxide with sulfonated lignin dispersant [1] | 35 | 0.25 | [2] 450 | 9 | | | |
| Titanium dioxide with ozone-oxidized lignin dispersant | 35 | 0.25 | [3] 7 | 1 | | | |

[1] Marasperse N-22, a sodium lignosulfonate available from American Can Company, Greenwich, Connecticut.
[2] In a 15% salt solution.
[3] Brookfield.

material presently used commercially. It would appear that the introduction of carboxyl groups into the lignin molecule by ozone oxidation results in a product of greater thermal stability than the introduction of sulfonic acid groups by sulfonation reactions carried out on alkali lignin or by pulping of wood by the sulfite process, which also results in lignosulfonate material.

In further testing of the dye dispersing capability of the ozone-oxidized lignin of the present invention, a standard yellow dye known to be rather difficult to disperse satisfactorily was ground in a sand mill with the lignin dispersant of this invention and control samples of the dye were similarly ground with the sulfonated lignin products presently in common commercial use in dispersing the yellow dye. The resulting dye pastes were then tested for degree of dispersion. The dispersion and test procedures utilized are as follows.

A charge consisting of 70 gm. of commercial yellow dye press-cake, 30 gm. of the lignin-based dispersant being tested, 200 gm. of water and 500 gm. of grinding sand was milled for 5 hours in a sand mill rotating at 2,000 r.p.m., screened through a 325 mesh screen to remove the sand, and the dye dispersion separated into two portions. One portion was pan dried at 55–60° C. and the other spray dried in a drier having an inlet temperature of 120° C. and an outlet temperature of 60° C. The separate dried samples of dye-dispersant blend were then subjected to tests of dispersability at three temperaures in the following manner:

(1) 70° C. test.—A 1 gm. sample of the dried dye and dispersant blend was pasted with 5 cc. of water at 60° C. and, when smoothly blended, an additional 95 cc. of water at 60° C. was added. The temperature was raised to 70° C. under agitation and the dispersion filtered over Whatman No. 4 filter paper of 9 cm. diameter. The suspension should pass the filter in 6 seconds or less and leave the paper dye-free.

(2) 95° C. test.—A 1 gm. sample of the dried dye and dispersant blend was pasted with 5 cc. of water at 60° C. and, when smoothly blended, an additional 160 cc. of water at 60° C. was added. The temperature was raised to 95° C. under agitation and the dispersion filtered over Whatman No. 3 filter paper of 15 cm. diameter. The time to filter should be less than 12 seconds and the paper should be dye-free.

(3) 130–35° C. test.—250 cc. of water and 0.6 gm. of the dried dye and dispersant blend were placed in a brass bomb, the bomb capped and placed in an oven at 130–35° C. After one half hour to reach a 130° C. temperature, the bomb was maintained at that temperature for an additional hour. After cooling and opening the bomb, the contents were heated to 85° C. on a steam bath and filtered through Reeves Angel No. 230 filter paper of 9 cm. diameter, A dye-free paper is desired.

The results of the Yellow Dye dispersion tests on the ozone-oxidized lignin of Example 1 and on three commercial lignosulfonate dispersing agents are given in the following Table III. Times are in seconds required to pass through the filter and the ratings are based on the dye remaining on the filter and on the filter time.

In the series of tests run in a bomb at 130° C., all of the commercial sulfonated products failed, whereas the ozone-oxidized lignin received a very good rating.

It is evident from the data in the above Table III that the ozone-oxidized lignin of this invention is an excellent dispersing agent for the difficult-to-disperse yellow press-cake dye, even at temperatures (95° C. and 130° C.) at which the commonly utilized sulfonated lignin dispersants fail.

The product of the present invention is also remarkably effective in the dispersion of a wide variety of pesticide compositions. Since the structure and properties of pesticides vary widely, no single sulfonated lignin product has been developed which is sufficiently versatile in its dispersive effects to serve as a "broad spectrum" dispersant in this field. It has therefore been the industry practice to vary the dispersant utilized in order to obtain optimum results with specific pesticides. It has now been found that the ozone-oxidized lignin product hereinbefore described is an excellent dispersant for a broad spectrum of pesticides, as is shown in the following series of tests, in which the ability of the dispersant to suspend a number of pesticides of varying properties is measured against that of the best available commercial sulfonated lignin product for the suspension of the particular pesticide tested.

Testing of the pesticide dispersion capability of the various dispersants is carried out in the following manner: 50 gm. of the selected pesticide is blended in a Waring blendor with 1.5 gm. of the dispersant being tested and 1 gm. of a suitable wetting agent to form a test blend of the pesticide and dispersant. For the suspension test, a standard hard water is prepared containing 0.304 gm. of anhydrous calcium chloride and 0.139 gm. of magnesium chloride hexahydrate per liter of solution. Fifty cc. of the standard hard water solution are agitated by high speed laboratory mixer with 4.0 gm. of the test blend of pesticide and dispersant and then diluted to 100 cc. volume in a 100 cc. graduated cylinder. Aftter thoroughly blending the contents, the cylinder is allowed to stand motionless for exactly 30 minutes. A 25 cc. sample is then withdrawn from the cylinder with a pipette, care being taken that the tip of the pipette is held precisely at the 50 cc. mark on the graduated cylinder during the withdrawal. The Pipetted sample is filtered through a tared filter paper which is then dried at 50° C. to determine the weight of pesticide which was in suspension in the 25cc. sample. Results are reported as percent of the pesticide which was in suspension.

The following Table IV illustrates the dispersive capacity of the ozone-oxidized lignin of Example I as utilized with a variety of pesticides, compared, in each case, with the most effective commercially available sulfonated lignin dispersant for the particular pesticide being dispersed.

TABLE III.—YELLOW DYE DISPERSION TESTS

| | Oven dried 55° C. | | | | Spray dried | | | |
|---|---|---|---|---|---|---|---|---|
| | 70° C. test | | 95° C. test | | 70° C. test | | 95° C. test | |
| Dispersant | Time, sec. | Rating | Time, sec. | Rating | Time, sec. | Rating | Time, sec. | Rating |
| Ozone-oxidized lignin from Example 1 | 3 | Very good | 7 | Very good | 4 | Very good | 8 | Very good. |
| Control | | | | | | | | |
| A [1] | | Failed | 35 | Failed | | Failed | | Failed. |
| B [2] | 8 | Poor | 67 | do | | do | | Do. |
| C [3] | 5 | Good | 10 | Good | | do | | Do. |

[1] A sodium salt of partially desulfonated lignosulfonate from sulfite pulping of wood.
[2] A sodium lignosulfonate from sulfite pulping of wood.
[3] A sodium lignosulfonate obtained by sulfonating the lignin obtained by acid precipitation from a kraft wood pulping spent liquor.

TABLE IV.—PESTICIDE SUSPENSION

| Pesticide | Control dispersant | Pesticide suspended | Pesticide suspended with ozonized lignin |
|---|---|---|---|
| DDT | Marasperse N-22 | 72.0 | 73.4 |
| Herban | Marasperse CB | 94.0 | 95.0 |
| Sevin | Norlig IIda | 70.5 | 87.6 |
| Cotoran | Marasperse B-22 | 88.2 | 93.0 |
| Geigy RS220702 | Marasperse V-42 | 54.6 | 54.4 |
| Geigy NV532202 | do | 72.4 | 74.7 |
| Geigy NV532203 | do | 81.5 | 82.9 |

NOTE.—Marasperse N-22 is a neutral sodium lignosulfonate obtained from sulfite spent liquor. Marasperse CB is a partially desulfonated sodium lignosulfonate obtained from sulfite spent liquor. Norlig IIda is calcium lignosulfonate obtained from spent sulfite liquor. Marasperse B-22 is a sodium lignosulfonate obtained from spent sulfite liquor and dried at a pH of 3.5-4.0. Marasperse V-42 is a sodium lignosulfonate obtained from spent sulfite liquor and having 10% of a polyphenolic material added thereto. All of these products are available from the American Can Company, Greenwich, Connecticut. Herban is a proprietary herbicide available from Hercules Chemical Company, Wilmington, Delaware. Sevin is an insecticide comprising 1-naphthyl N-methyl carbamate, available from Union Carbide and Carbon Chemical Company, Charleston, North Carolina. Cotoran is a proprietary herbicide available from CIBA Agricultural Chemical Company, Vero Beach, Florida. The Geigy pesticides listed are available from Geigy Agricultural Chemical Company, Ardsley, New York.

It is evident from the above table that ozone-oxidized lignin is effective in dispersing a variety of pesticide materials. This desirable property of broad-spectrum dispersive utility is unusual among the lignin-based dispersants, which generally exhibit a substantial degree of specificity in pesticide dispersion, none of the sulfonated lignins being capable of performing in a uniformly satisfactory manner in dispersion of all members of the variety of pesticides listed above.

The effectiveness of the ozone-oxidized lignin as a dispersing agent is dependent upon the conversion of certain structural elements of the lignin molecule into carboxyl groups which impart solubility to the lignin over a wide range of hydrogen ion concentration. As the degree of ozone absorption and reaction with lignin is increased from 0% up to about 20%, the water and acid solubility of the resulting ozone-oxidized lignin is increased and the dispersant powers of the product are correspondingly improved. Very high degrees of ozone absorption, however, result in a less versatile product, presumably because, in these cases, the ozone modifies or destroys some of the complex molecular structural elements of the lignin which contribute to the dispersion effectiveness of this material.

The effect of varying degrees of ozone oxidation on the acid-solubility of lignin from kraft process liquor is shown in the following Table V. The ozone treatment was carried out in accordance with the procedure of Example 1, the degree of ozone absorption being controlled by the amount of time during which the ozone generator was in operation. In the control sample (0% ozone absorption) pure oxygen was passed through the reaction mixture under the conditions of Example 1 except that the power was not turned on in the ozone generator. This test, then, is also indicative of the oxidative effect of pure oxygen on the solubility of lignin.

TABLE V.—ACID SOLUBILITY OF OZONE-OXIDIZED LIGNIN (1% SOLUTION)

| Degree of ozone absorption: | Solubility as a function of pH |
|---|---|
| 0% (Control) | Soluble only above pH 10. |
| 2 | Soluble above pH 6. |
| 7 | Soluble above pH 4. |
| 12 | Soluble above pH 2.5. |
| 20 | Soluble above pH 2. |
| 30 | Soluble above pH 2. |

The above control sample prepared by treatment with pure oxygen (no ozone) was compared with the ozone-oxidized lignin of Example 1 in a test of dispersive capability on the standard yellow presscake dye and on Steller clay by the test procedures previously described for each of these materials. The results are presented in the following Table VI.

TABLE VI.—COMPARISON OF OXYGEN-TREATED AND OZONE-TREATED LIGNIN FROM KRAFT LIQUOR

| | Yellow dye dispersion | | | | Clay dispersion | |
|---|---|---|---|---|---|---|
| | Tray dried | | Spray dried | | | |
| Material tested | 70° C. | 90° C. | 70° C. | 90° C. | Yield point | Viscosity (Fann) |
| Control-oxygenated lignin | Pass | Poor | Fail | Fail | 140 | 80 |
| Ozone-oxidized lignin of Example 1 | do | Pass | Pass | Pass | 10 | 10 |

It is evident from the results of the above dispersion tests that the oxygen treated lignin is not a satisfactory dispersant for either of the materials tested, whereas the ozone-oxidized lignin is an excellent dispersant. It is believed that this is due to the solubilizing action of the carboxyl groups produced by the action of ozone on the carbonyl, methoxy and active hydrogen groupings in the lignin molecule.

In general, in the preparation of the ozonized lignin product of this invention, lignin from the alkaline pulping of softwood is to be preferred to that from hardwood, although the hardwood lignin product is satisfactory for a number of uses. Ozonized softwood lignin is a slightly more active dispersant and is more versatile in its utility than the equivalent product prepared from hardwood lignin. More specifically, the ozonized softwood lignin product is more satisfactory in those applications requiring high temperature stability. This relationship is shown in the following Table VII, in which lignin obtained from the pulping liquors from varying blends of hardwood and softwood was ozonized according to the procedure of Example 1 and tested for dispersive activity in the yellow presscake dye test previously described.

TABLE VII.—EFFECT OF LIGNIN SOURCE ON DISPERSIVE QUALITIES

| Lignin source, percent | | | Yellow dye test | | | |
|---|---|---|---|---|---|---|
| Hard-wood | Soft-wood | Ozone treatment | Tray dried | | Spray dried | |
| | | | 70° test | 90° test | 70° test | 90° test |
| 50 | 50 | 12 | Pass | Pass | Fail | Fail (poor). |
| 15 | 85 | 12 | do | do | Pass | Pass. |
| 0 | 100 | 13 | do | do | Very good | Very good. |

The ozonized lignin obtained from blended hardwood-softwood source lignin was found satisfactory in the less stringent dispersion tests but was not quite as outstanding as the material prepared from pure softwood lignin.

Ozone is readily absorbed by and reacted with lignin under the conditions hereinbefore set forth in Example 1 until about 15-18% of ozone based on lignin weight has been absorbed. Above this range, the efficiency of ozone absorption falls off rapidly and it is difficult to obtain ozone absorption values higher than about 20%, presumably due to the substantial increase in viscosity of the reaction mixture as the reaction proceeds. At higher viscosities, the ozone tends to pass unabsorbed through the mixture. Higher ozone absorption can be achieved in more dilute lignin solutions, however, and ozone absorption values as high as 30% have been obtained in lignin solutions of 5% solids concentration. The resulting ozonized lignin material is a good dispersant for clay but is not as satisfactory a dispersant for dyes as is the ozonized lignin in the 5-20% ozone absorption range as is indicated by the data of Table VIII.

TABLE VIII.—EFFECT OF HIGH OZONE ABSORPTION

| | Clay dispersion test | | Yellow dye dispersion test, spray dried | |
|---|---|---|---|---|
| Percent ozone absorption | Yield point | Apparent viscosity | 70°.test | 95° test |
| 12 | 158 | 101 | Very good | Very good. |
| 30 | 70 | 42 | Fail | Fail. |

It should be noted that the data given for yield point and viscosity of a given ozonized lignin product in the clay dispersion test vary substantially from one table to another as presented herein. This is due to the varying characteristics of different batches of the test clay, as well as different dispersant dosages, and it should therefore be emphasized that the clay dispersion data are relevant only within a given table wherein all tests were run on the same clay and under controlled identical conditions.

It has been hereinbefore mentioned that the ozone oxidation of lignin may be carried out over a substantial temperature range without substantial difference in the quality of the resulting ozone-oxidized lignin product. In general, reaction temperatures between 15° C. and 60° C. are preferred. Substantially higher reaction temperatures result in a product of much higher viscosity which shows somewhat less high temperature stability and is therefore less universally applicable as a dispersant, particularly for dyes, although it is quite satisfactory for use in those applications having less stringent requirements. Temperatures lower than 15° C. also yield a satisfactory product, but are economically unattractive due to the large amount of cooling required to maintain the low temperature in the reaction mixture. The effect of varying the reaction temperature is shown in the following Table IX. In each case, the degree of ozone absorption was 12%, and the lignin used was obtained from softwood kraft spent liquor.

TABLE IX.—EFFECT OF REACTION TEMPERATURE ON OZONIZED LIGNIN

| Reaction temperature,° C. | Viscosity of reaction product (Brookfield), cps. at 110° F. | Clay dispersion test | | Yellow dye dispersion test, spray dried | |
|---|---|---|---|---|---|
| | | Yield point | Apparent viscosity, cps. | 75° test | 90° test |
| 25 | 10 | 46 | 34 | 3.0 sec., Good. | 17 sec., Pass. |
| 55 | 70 | 62 | 41 | ...do... | 65 sec., Poor. |
| 85 | 36,000 | 106 | 63 | ...do... | 120 sec., Fail. |

The data presented in the foregoing tables indicate that a water- and acid-soluble, substantially sulfur-free lignin surface active material having excellent dispersant properties as applied to a wide variety of dyes, pesticides and inorganic materials may be prepared by treating lignin from alkaline wood pulping processes with ozone at temperatures ranging from about 0° C. to about 90° C. until between 5% and 30% of ozone based on the lignin weight is absorbed. A product having the most desirable temperature stability and widest applicability as a dispersant may be most economically obtained if the reaction is carried out between about 15° C. and 60° C. until between about 10 and 15% of ozone have been absorbed by the lignin and this is the preferred product of this invention.

Having now disclosed and described in detail preferred forms of the invention, it is obvious that many modifications are possible without departing from the spirit thereof. Therefore, no limitations on the invention are intended except as specifically set forth in the appended claims.

I claim:

1. A broad spectrum dispersing agent soluble in water, alkaline and acidic solutions having a pH of 2 and above comprising lignin isolated from spent liquors from the alkaline pulping of wood and subjected, while maintained in alkaline aqueous solution at a temperature between about 0° C. and about 90° C., to the oxidative effects of between 5% and 30% by weight of ozone based on the weight of said lignin.

2. A dispersing agent according to claim 1 wherein said lignin is subjected to the oxidative effects of between 11 and 14% by weight of ozone based on the weight of lignin.

3. A water- and acid-soluble dispersing agent substantially free of organically bound sulfur, comprising lignin oxidized by ozone while maintained in aqueous alkaline solution at a temperature between about 0° C. and about 90° C., said ozone being absorbed by and reacted with said lignin in an amount between 5 and 30% of the weight of said lignin.

4. A dispersing agent according to claim 3 wherein said lignin is oxidized by ozone in an amount between 5 and 20% of the weight of said lignin.

5. A method for preparing a water-, alkaline- and acid-soluble, lignin-based dispersing agent substantially free of organically bound sulfur which comprises:
   (a) isolating lignin from the spent liquor obtained by the alkaline pulping of wood by acidification of said liquor to precipitate lignin, filtering the precipitated lignin from said acidified liquor and washing the precipitate,
   (b) dissolving said precipitated lignin in an alkaline aqueous medium,
   (c) passing oxygen containing ozone through said alkaline solution of lignin at a temperature between about 0° C. and 90° C. for a period of time sufficient to absorb in said solution between 5 and 30% by weight of ozone based on the weight of lignin in said solution while maintaining the pH of said solution above 8 thereby to obtain ozone-oxidized lignin in said solution, and
   (d) drying said solution of ozone-oxidized lignin to a substantially dry state.

6. A method according to claim 5 wherein said lignin is dissolved in an amount of between 5 and 25% lignin solids in said aqueous caustic alkali, and wherein said ozone is absorbed in an amount between 5 and 20% by weight of ozone based on the weight of lignin in said solution.

References Cited

Dorland et al.: "J. Amer. Chem. Soc.," vol. 61 (1939), pp. 2698–2701.

Phillips et al., "J. Amer. Chem. Soc.," vol. 55 (1933), pp. 3466–70.

Richtzenhaini: "Ber.," vol. 75 (1942), pp. 269, 277, 278.

LEWIS GOTTS, Primary Examiner

D. R. PHILLIPS, Assistant Examiner

U.S. Cl. X.R.

8—79, 83; 106—90; 71—120, DIG. 1; 252—8.5 C, 353; 264—DIG. 21, DIG. 43; 260—124 R, 208; 424—171, 300, 354